(12) United States Patent
Teranishi et al.

(10) Patent No.: US 11,402,610 B2
(45) Date of Patent: Aug. 2, 2022

(54) CAMERA OPTICAL LENS

(71) Applicant: AAC Optics Solutions Pte. Ltd., Singapore (SG)

(72) Inventors: Takaaki Teranishi, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 368 days.

(21) Appl. No.: 16/677,585

(22) Filed: Nov. 7, 2019

(65) Prior Publication Data

US 2020/0409041 A1 Dec. 31, 2020

(30) Foreign Application Priority Data

Jun. 30, 2019 (CN) .......................... 201910581747.3

(51) Int. Cl.
*G02B 9/62* (2006.01)
*G02B 13/00* (2006.01)
*G02B 27/00* (2006.01)

(52) U.S. Cl.
CPC ........... *G02B 9/62* (2013.01); *G02B 13/0045* (2013.01); *G02B 27/005* (2013.01)

(58) Field of Classification Search
None
See application file for complete search history.

(56) References Cited

U.S. PATENT DOCUMENTS

| | | | | |
|---|---|---|---|---|
| 2013/0155527 A1* | 6/2013 | Yoneyama | ............... | G02B 7/04 359/745 |
| 2015/0070784 A1* | 3/2015 | Chen | ......................... | G02B 9/62 359/713 |
| 2016/0377841 A1* | 12/2016 | Kubota | .................... | G02B 9/12 359/755 |

* cited by examiner

*Primary Examiner* — Darryl J Collins
(74) *Attorney, Agent, or Firm* — W&G Law Group

(57) ABSTRACT

The present disclosure relates to the technical field of optical lens and discloses a camera optical lens. The camera optical lens includes, from an object side to an image side: a first lens, a second lens having a positive refractive power, a third lens having a negative refractive power, a fourth lens, a fifth lens and a sixth lens. And the camera optical lens satisfies following conditions: $-5.00 \leq f1/f3 \leq -2.50$ and $-10.00 \leq R5/R6 \leq -2.00$, where f1 denotes a focal length of the first lens; f3 denotes a focal length of the third lens; R5 denotes a curvature radius of an object-side surface of the third lens; and R6 denotes a curvature radius of an image-side surface of the third lens. The camera optical lens of the present disclosure can achieve a high imaging performance while obtaining a low TTL.

18 Claims, 7 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structure gradually appear in lens designs. There is an urgent need for ultra-thin wide-angle camera lenses which with good optical characteristics and fully corrected chromatic aberration.

DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
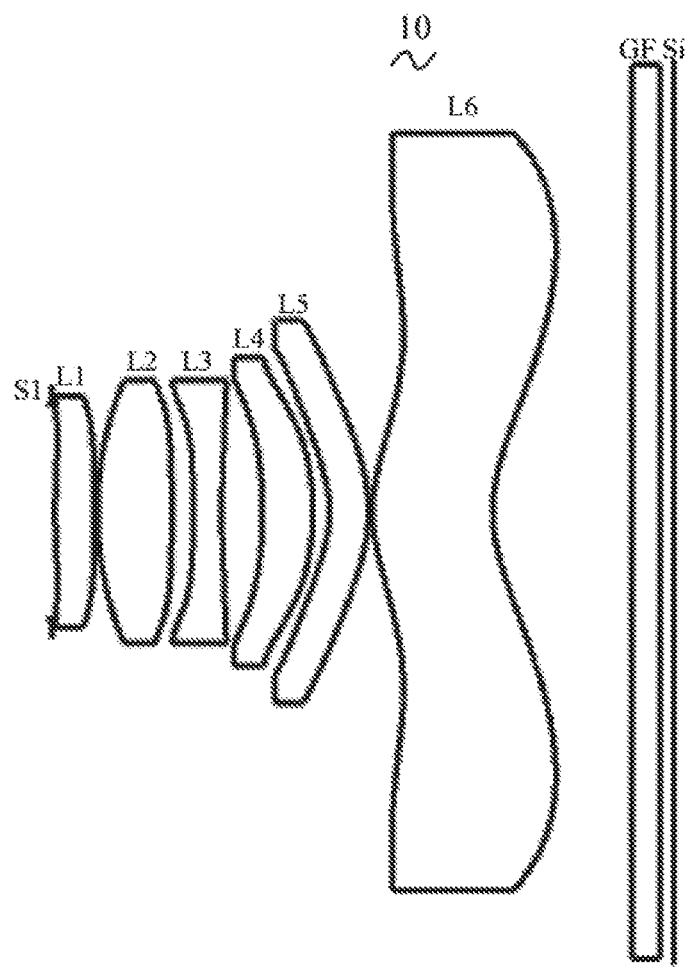
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, the camera optical lens 10 includes six lenses. Specifically, the camera optical lens 10 includes, from an object side to an image side: an aperture S1, a first lens L1, a second lens L2, a third lens L3, a fourth lens L4, a fifth lens L5 and a sixth lens L6. An optical element such as an optical filter GF can be arranged between the sixth lens L6 and an image surface Si.

The first lens L1, the second lens L2, the third lens L3, the fourth lens L4, the fifth lens L5, and the sixth lens L6 are all made of plastic material.

Here, a focal length of the first lens L1 is defined as f1, a focal length of the third lens L3 is defined as f3, and the camera optical lens 10 should satisfy a condition of $-5.00 \leq f1/f3 \leq -2.50$, which specifies a ratio of the focal length f1 of the first lens L1 and the focal length f3 of the third lens L3. This can effectively reduce a sensitivity of the camera optical lens and further enhance an imaging quality. Preferably, the camera optical lens 10 further satisfies a condition of $-4.97 \leq f1/f3 \leq -2.52$.

A curvature radius of an object-side surface of the third lens is defined as R5, a curvature radius of an image-side surface of the third lens is defined as R6, and the camera optical lens 10 further satisfies a condition of $-10.00 \leq R5/R6 \leq -2.00$, which specifies a shape of the third lens L3. Within this range, a development towards ultra-thin and wide-angle lenses would facilitate correcting a problem like an on-axis aberrations. Preferably, the camera optical lens 10 further satisfies a condition of $-9.98 \leq R5/R6 \leq -2.05$.

A total optical length from an object-side surface of the first lens to the image surface Si of the camera optical lens along an optical axis is defined as TTL.

When the focal length f1 of the first lens L1, the focal length f3 of the third lens L3, the curvature radius R5 of the object-side surface of the third lens L3, and the curvature radius R6 of the image-side surface of the third lens L3 all satisfy the above conditions, the camera optical lens 10 has an advantage of high performance and satisfies a design requirement of low TTL.

In an embodiment, the object-side surface of the first lens L1 is convex in a paraxial region, and an image-side surface of the first lens L1 is concave in the paraxial region, and the first lens L1 has a positive refractive power.

A focal length of the camera optical lens 10 is defined as f, and the camera optical lens 10 should satisfy a condition of $2.48 \leq f1/f \leq 14.54$, which specifies a ratio of the focal length f1 of the first lens L1 and the focal length f of the camera optical lens 10. In this way, the first lens has an appropriate positive refractive power, thereby facilitating reducing an aberration of the system while facilitating a development towards ultra-thin and wide-angle lenses. Preferably, the camera optical lens 10 further satisfies a condition of $3.97 \leq f1/f \leq 11.63$.

A curvature radius of the object-side surface of the first lens L1 is defined as R1, a curvature radius of the image-side surface of the first lens L1 is defined as R2, and the camera optical lens 10 further satisfies a condition of $-11.43 \leq (R1+R2)/(R1-R2) \leq -1.81$. This can reasonably control a shape of the first lens L1 in such a manner that the first lens L1 can effectively correct a spherical aberration of the camera optical lens. Preferably, the camera optical lens 10 further satisfies a condition of $-7.14 \leq (R1+R2)/(R1-R2) \leq -2.26$.

An on-axis thickness of the first lens L1 is defined as d1, and the camera optical lens 10 further satisfies a condition of $0.03 \leq d1/TTL \leq 0.09$. This can facilitate achieving ultra-thin lenses. Preferably, the camera optical lens 10 further satisfies a condition of $0.05 \leq d1/TTL \leq 0.07$.

In an embodiment, an object-side surface of the second lens L2 is convex in the paraxial region, and an image-side surface is convex in the paraxial region; and the second lens L2 has a positive refractive power.

A focal length of the second lens L2 is defined as f2, and the camera optical lens 10 further satisfies a condition of $0.49 \leq f2/f \leq 1.62$. By controlling a positive refractive power of the second lens L2 within a reasonable range, correction of an aberration of the optical system can be facilitated. Preferably, the camera optical lens 10 further satisfies a condition of $0.78 \leq f2/f \leq 1.29$.

A curvature radius of the object-side surface of the second lens L2 is defined as R3, a curvature radius of the image-side surface of the second lens L2 is defined as R4, and the camera optical lens 10 further satisfies a condition of $-1.29 \leq (R3+R4)/(R3-R4) \leq -0.40$, which specifies a shape of the second lens L2. Within this range, a development towards ultra-thin and wide-angle lenses would facilitate correcting the problem of the on-axis aberration. Preferably, the camera optical lens 10 further satisfies a condition of $-0.80 \leq (R3+R4)/(R3-R4) \leq -0.50$.

An on-axis thickness of the second lens L2 is defines as d3, and the camera optical lens 10 further satisfies a condition of $0.06 \leq d3/TTL \leq 0.18$. This can facilitate achieving ultra-thin lenses. Preferably, the camera optical lens 10 further satisfies a condition of $0.10 \leq d3/TTL \leq 0.15$.

In an embodiment, the object-side surface of the third lens L3 is concave in the paraxial region, and the image-side surface is concave in the paraxial region, and the third lens L3 has a negative refractive power.

A focal length of the third lens L3 is defined as f3, and the camera optical lens 10 further satisfies a condition of $-3.96 \leq f3/f \leq -1.31$. An appropriate distribution of the refractive power leads to a better imaging quality and a lower sensitivity. Preferably, the camera optical lens 10 further satisfies a condition of $-2.48 \leq f3/f \leq -1.63$.

In an embodiment, the camera optical lens 10 further satisfies a condition of $0.18 \leq (R5+R6)/(R5-R6) \leq 1.23$. This can effectively control a shape of the third lens L3, thereby facilitating shaping of the third lens and avoiding bad shaping and generation of stress due to an the overly large surface curvature of the third lens L3. Preferably, the camera optical lens 10 further satisfies a condition of $0.28 \leq (R5+R6)/(R5-R6) \leq 0.98$.

An on-axis thickness of the third lens L3 is defined as d5, and the camera optical lens 10 further satisfies a condition of $0.02 \leq d5/TTL \leq 0.07$. This can facilitate achieving ultra-thin lenses. Preferably, the camera optical lens 10 further satisfies a condition of $0.04 \leq d5/TTL \leq 0.06$.

In an embodiment, an object-side surface of the fourth lens L4 is concave in the paraxial region, and an image-side surface of the fourth lens L4 is convex in the paraxial region, and the fourth lens L4 has a positive refractive power.

A focal length of the fourth lens L4 is defined as f4, and the camera optical lens 10 further satisfies a condition of $1.28 \leq f4/f \leq 4.11$. The appropriate distribution of the refractive power leads to the better imaging quality and the lower sensitivity. Preferably, the camera optical lens 10 further satisfies a condition of $2.04 \leq f4/f \leq 3.29$.

A curvature radius of the object-side surface of the fourth lens L4 is defined as R7, a curvature radius of the image-side surface of the fourth lens L4 is defined as R8, and the camera optical lens 10 further satisfies a condition of $2.02 \leq (R7+R8)/(R7-R8) \leq 6.62$, which specifies a shape of the fourth lens L4. Within this range, a development towards ultra-thin and wide-angle lens would facilitate correcting a problem like an off-axis aberration. Preferably, the camera optical lens 10 further satisfies a condition of $3.23 \leq (R7+R8)/(R7-R8) \leq 5.30$.

An on-axis thickness of the fourth lens L4 is defined as d7, and the camera optical lens 10 further satisfies a condition of $0.04 \leq d7/TTL \leq 0.12$. This can facilitate achieving ultra-thin lenses. Preferably, the camera optical lens 10 further satisfies a condition of $0.06 \leq d7/TTL \leq 0.10$.

In an embodiment, an object-side surface of the fifth lens L5 is concave in the paraxial region, and an image-side surface of the fifth lens L5 is convex in the paraxial region, and the fifth lens L5 has a negative refractive power.

A focal length of the fifth lens L5 is defined as f5, and the camera optical lens 10 further satisfies a condition of $-4.02 \leq f5/f \leq -1.26$, this specifies the fifth lens, which can effectively make a light angle of the camera lens gentle and reduce a tolerance sensitivity. Preferably, the camera optical lens 10 further satisfies a condition of $-2.51 \leq f5/f \leq -1.58$.

A curvature radius of the object-side surface of the fifth lens L5 is defined as R9, a curvature radius of the image-side surface of the fifth lens L5 is defined as R10, and the camera optical lens 10 further satisfies a condition of $-11.96 \leq (R9+R10)/(R9-R10) \leq -3.76$, which specifies a shape of the fifth lens L5. Within this range, a development towards ultra-thin and wide-angle lenses can facilitate correcting a problem of the off-axis aberration. Preferably, the camera optical lens 10 further satisfies a condition of $-7.47 \leq (R9+R10)/(R9-R10) \leq -4.70$.

An on-axis thickness of the fifth lens L5 is defined as d9, and the camera optical lens 10 further satisfies a condition of $0.03 \leq d9/TTL \leq 0.10$. This can facilitate achieving ultra-thin lenses. Preferably, the camera optical lens 10 further satisfies a condition of $0.05 \leq d9/TTL \leq 0.08$.

In an embodiment, an object-side surface of the sixth lens L6 is convex in the paraxial region, and an image-side surface of the sixth lens L6 is concave in the paraxial region, and the sixth lens L6 has a positive refractive power.

A focal length of the sixth lens L6 is defined as f6, and the camera optical lens 10 further satisfies a condition of $0.95 \leq f6/f \leq 2.91$. The appropriate distribution of the refractive power leads to the better imaging quality and the lower sensitivity. Preferably, the camera optical lens 10 further satisfies a condition of $1.51 \leq f6/f \leq 2.33$.

A curvature radius of the object-side surface of the sixth lens L6 is defined as R11, a curvature radius of the image-side surface of the sixth lens L6 is defined as R12, and the camera optical lens 10 further satisfies a condition of $-253.81 \leq (R11+R12)/(R11-R12) \leq -52.28$, which specifies a shape of the sixth lens L6. Within this range, a development towards ultra-thin and wide-angle lenses would facilitate correcting a problem of the off-axis aberration. Preferably, the camera optical lens 10 further satisfies a condition of $-158.63 \leq (R11+R12)/(R11-R12) \leq -65.35$.

An on-axis thickness of the sixth lens L6 is defined as d11, and the camera optical lens 10 further satisfies a condition of 0.09≤d11/TTL≤0.29. This can facilitate achieving ultra-thin lenses. Preferably, the camera optical lens 10 further satisfies a condition of 0.15≤d11/TTL≤0.23.

In an embodiment, a combined focal length of the first lens and of the second lens is defined as f12, and the camera optical lens 10 further satisfies a condition of 0.45≤f12/f≤1.36. This can eliminate the aberration and distortion of the camera optical lens and reduce a back focal length of the camera optical lens, thereby maintaining miniaturization of an imaging lens system group. Preferably, the camera optical lens 10 further satisfies a condition of 0.72≤f12/f≤1.09.

In an embodiment, the total optical length TTL of the camera optical lens 10 is less than or equal to 5.06 mm, which is beneficial for achieving ultra-thin lenses. Preferably, the total optical length TTL of the camera optical lens 10 is less than or equal to 4.83 mm.

In an embodiment, an F number of the camera optical lens 10 is less than or equal to 2.11. The camera optical lens has a large aperture and a better imaging performance. Preferably, the F number of the camera optical lens 10 is less than or equal to 2.07.

With such designs, the total optical length TTL of the camera optical lens 10 can be made as short as possible, thus the miniaturization characteristics can be maintained.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object-side surface of the first lens to the image surface of the camera optical lens along the optical axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R | d | nd |  | vd |  |
| --- | --- | --- | --- | --- | --- | --- |
| S1 | ∞ | d0 = 0.020 |  |  |  |  |
| R1 | 4.778 | d1 = 0.285 | nd1 | 1.5445 | v1 | 55.99 |
| R2 | 10.346 | d2 = 0.029 |  |  |  |  |
| R3 | 2.270 | d3 = 0.555 | nd2 | 1.5445 | v2 | 55.99 |
| R4 | −10.464 | d4 = 0.158 |  |  |  |  |
| R5 | −12.769 | d5 = 0.212 | nd3 | 1.6447 | v3 | 22.48 |
| R6 | 6.081 | d6 = 0.304 |  |  |  |  |
| R7 | −3.090 | d7 = 0.374 | nd4 | 1.5352 | v4 | 56.09 |
| R8 | −1.949 | d8 = 0.125 |  |  |  |  |
| R9 | −0.815 | d9 = 0.289 | nd5 | 1.6713 | v5 | 19.24 |
| R10 | −1.151 | d10 = 0.030 |  |  |  |  |
| R11 | 1.039 | d11 = 0.894 | nd6 | 1.5352 | v6 | 56.09 |
| R12 | 1.066 | d12 = 1.037 |  |  |  |  |
| R13 | ∞ | d13 = 0.210 | ndg | 1.5168 | vg | 64.17 |
| R14 | ∞ | d14 = 0.100 |  |  |  |  |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of an object-side surface of the optical filter GF;

R14: curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF;

d13: on-axis thickness of the optical filter GF;

d14: on-axis distance from the image-side surface to the image surface of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.0665E+01 | −1.6010E−01 | −1.3427E−01 | 1.9501E−02 | 6.9177E−01 | −1.5299E+00 | 1.1170E+00 | −1.3705E−01 |
| R2 | −1.3749E+02 | −3.0642E−01 | 2.3535E−01 | −2.3145E−01 | 3.2342E−03 | 6.6157E−01 | −1.1398E+00 | 6.4568E−01 |
| R3 | −8.5653E+00 | −4.6840E−03 | 1.5513E−01 | −7.4130E−02 | −8.8665E−02 | −1.0436E−02 | 4.8514E−02 | 2.8277E−02 |
| R4 | −4.9052E+01 | −5.7448E−03 | −1.0798E−01 | −1.8122E−01 | 1.8224E−01 | −1.1333E−02 | −1.7667E−02 | 5.9440E−02 |
| R5 | 8.7824E+01 | −1.5083E−01 | −1.4811E−01 | −9.3699E−02 | 2.1765E−01 | 2.1383E−01 | −1.8089E−02 | −1.2954E−01 |
| R6 | 4.9206E+00 | −5.0677E−02 | −7.5145E−02 | 2.2519E−02 | 8.4537E−02 | 1.7812E−02 | −4.7755E−02 | 2.5568E−02 |
| R7 | −4.1722E+00 | −1.1315E−01 | 3.3610E−02 | 5.6229E−03 | −4.8970E−02 | −2.4880E−02 | 8.0024E−02 | −5.0058E−04 |
| R8 | 1.5214E+00 | −1.0843E−01 | 5.7746E−02 | 2.5575E−02 | 8.8461E−03 | 1.2515E−02 | 5.8725E−03 | −2.8737E−03 |
| R9 | −6.2639E+00 | −3.8908E−03 | 3.0165E−03 | 9.8609E−03 | −1.7808E−03 | −6.1088E−03 | −2.1908E−03 | 1.3249E−03 |
| R10 | −3.5101E+00 | 4.6545E−02 | −1.6086E−02 | −1.7982E−03 | 1.7025E−04 | 1.3866E−04 | 1.8139E−05 | 3.6402E−06 |
| R11 | −7.2286E+00 | −7.1510E−02 | 1.1103E−02 | 1.4038E−04 | −4.6431E−05 | −7.2001E−06 | −2.2266E−06 | 3.7549E−07 |
| R12 | −4.3550E+00 | −3.8805E−02 | 7.0839E−03 | −9.2913E−04 | 5.4988E−05 | −5.9794E−07 | −1.3069E−07 | 7.0178E−09 |

Here, K is a conic coefficient, and A4, A6, A8, A10, A12, A14, and A16 are aspheric surface coefficients.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and the arrest point of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 |
|---|---|---|---|
| P1R1 | 1 | 0.325 | |
| P1R2 | 1 | 0.165 | |
| P2R1 | 0 | | |
| P2R2 | 1 | 0.875 | |
| P3R1 | 1 | 0.795 | |
| P3R2 | 2 | 0.435 | 0.735 |
| P4R1 | 1 | 0.875 | |
| P4R2 | 1 | 0.885 | |
| P5R1 | 0 | | |
| P5R2 | 0 | | |
| P6R1 | 2 | 0.545 | 1.755 |
| P6R2 | 1 | 0.765 | |

TABLE 4

| | Number of arrest point | Arrest point position 1 |
|---|---|---|
| P1R1 | 1 | 0.535 |
| P1R2 | 1 | 0.285 |
| P2R1 | 0 | |
| P2R2 | 0 | |
| P3R1 | 0 | |
| P3R2 | 0 | |
| P4R1 | 0 | |
| P4R2 | 0 | |
| P5R1 | 0 | |
| P5R2 | 0 | |
| P6R1 | 1 | 1.305 |
| P6R2 | 1 | 1.915 |

Figure 2:
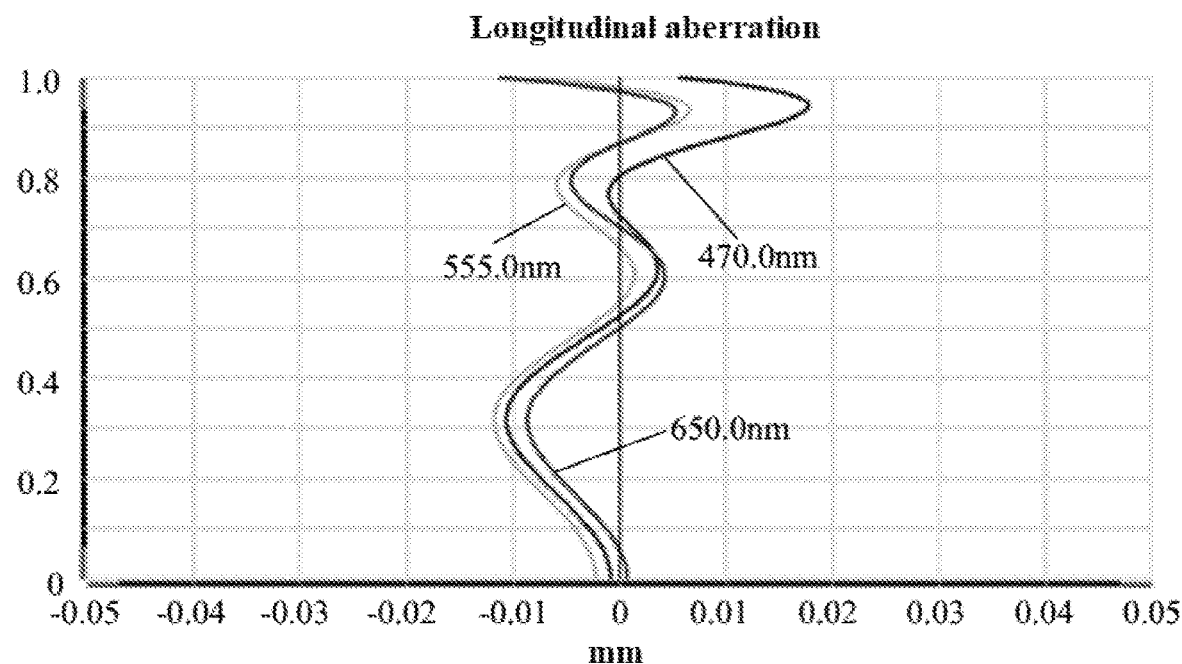
FIG. 2 is a schematic diagram of a longitudinal aberration of the camera optical lens shown in FIG. 1.
Figure 3:
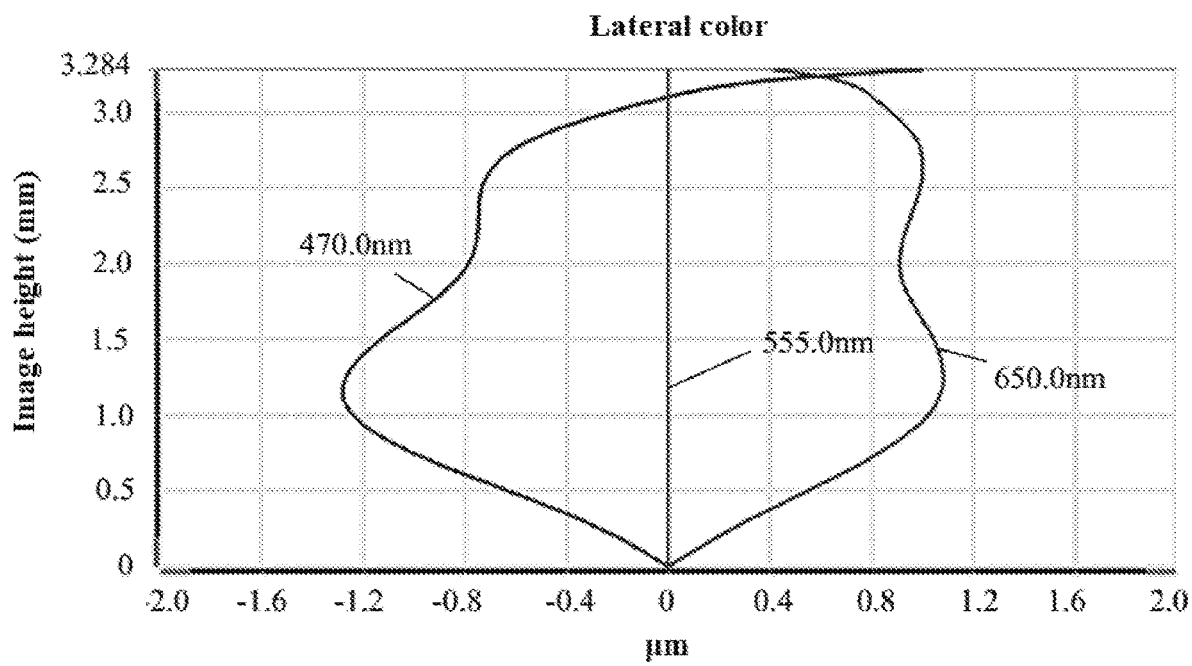
FIG. 3 is a schematic diagram of a lateral color of the camera optical lens shown in FIG. 1.
Figure 4:
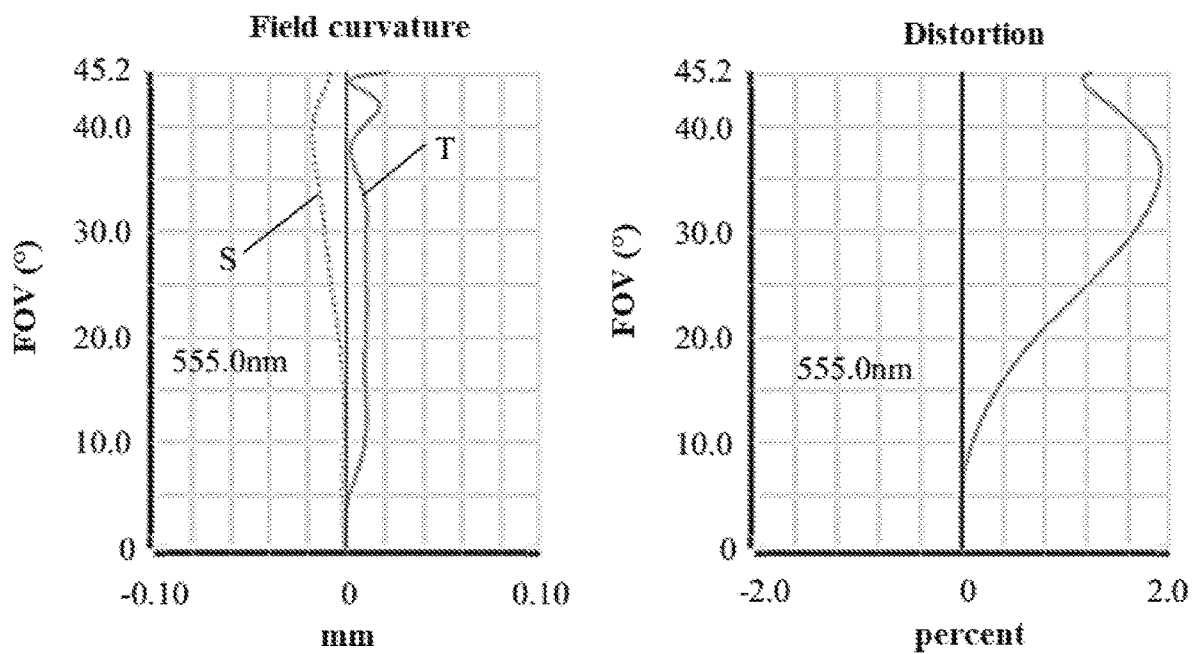
FIG. 4 is a schematic diagram of a field curvature and a distortion of the camera optical lens shown in FIG. 1.
Figure 5:
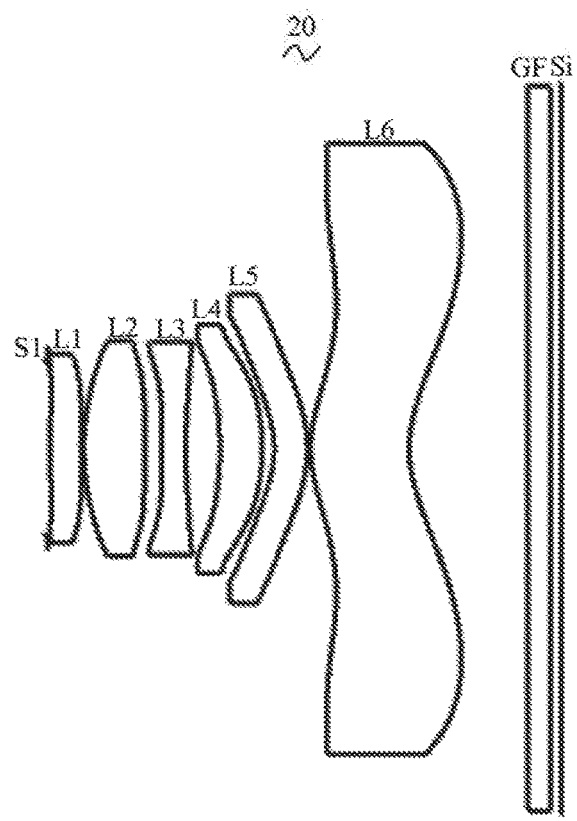
FIG. 5 is a schematic diagram of a structure of a camera optical lens according to Embodiment 2 of the present disclosure.

FIG. 2 and FIG. 3 illustrate a longitudinal aberration and a lateral color with wavelengths of 470.0 nm, 555.0 nm and 650.0 nm after passing the camera optical lens 10 according to Embodiment 1, respectively. FIG. 4 illustrates a field curvature and a distortion with a wavelength of 555.0 nm after passing the camera optical lens 10 according to Embodiment 1. A field curvature S in FIG. 4 is a field curvature in a sagittal direction, and T is a field curvature in a tangential direction.

Table 13 shows various values of Embodiments 1, 2, 3 and values corresponding to parameters which are specified in the above conditions.

As shown in Table 13, Embodiment 1 satisfies the above conditions.

In an Embodiment, an entrance pupil diameter of the camera optical lens is 1.570 mm, an image height of 1.0H is 3.284 mm, an FOV (field of view) in a diagonal direction is 90.41°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

|  | R | d |  | nd |  | vd |
|---|---|---|---|---|---|---|
| S1 | ∞ | d0 = 0.020 | | | | |
| R1 | 5.184 | d1 = 0.277 | nd1 | 1.5445 | v1 | 55.99 |
| R2 | 8.990 | d2 = 0.029 | | | | |
| R3 | 2.168 | d3 = 0.548 | nd2 | 1.5445 | v2 | 55.99 |
| R4 | −9.405 | d4 = 0.150 | | | | |
| R5 | −29.473 | d5 = 0.212 | nd3 | 1.6447 | v3 | 22.48 |
| R6 | 4.831 | d6 = 0.308 | | | | |
| R7 | −3.207 | d7 = 0.382 | nd4 | 1.5352 | v4 | 56.09 |
| R8 | −1.933 | d8 = 0.111 | | | | |
| R9 | −0.812 | d9 = 0.300 | nd5 | 1.6713 | v5 | 19.24 |
| R10 | −1.162 | d10 = 0.030 | | | | |
| R11 | 1.042 | d11 = 0.886 | nd6 | 1.5352 | v6 | 56.09 |
| R12 | 1.065 | d12 = 1.058 | | | | |
| R13 | ∞ | d13 = 0.210 | ndg | 1.5168 | vg | 64.17 |
| R14 | ∞ | d14 = 0.100 | | | | |

Table 6 shows aspherical surface data of each lens of the camera optical lens 20 in Embodiment 2 of the present disclosure.

TABLE 6

| | Conic coefficient | Aspheric surface coefficients | | | | | | |
|---|---|---|---|---|---|---|---|---|
| | k | A4 | A6 | A8 | A10 | A12 | A14 | A16 |
| R1 | 1.0051E+01 | −1.5972E−01 | −1.3718E−01 | 6.3931E−02 | 6.8212E−01 | −1.6168E+00 | 1.0426E+00 | 5.2953E−02 |
| R2 | −1.4511E+02 | −3.0760E−01 | 2.2425E−01 | −2.0890E−01 | 9.3338E−03 | 6.2184E−01 | −1.1835E+00 | 7.3616E−01 |
| R3 | −8.5361E+00 | 1.5168E−04 | 1.4822E−01 | −9.4705E−02 | −8.3776E−02 | 2.2907E−02 | 7.5147E−02 | −4.1900E−03 |
| R4 | −1.1321E+02 | −4.4197E−03 | −9.3880E−02 | −1.8847E−01 | 1.8515E−01 | 1.0602E−02 | 3.1729E−03 | 3.3868E−02 |
| R5 | 1.2081E+02 | −1.4155E−01 | −1.4761E−01 | −8.0605E−02 | 2.0517E−01 | −3.4321E−02 | −1.2445E−01 | |
| R6 | 3.8386E+00 | −5.1647E−02 | −7.1579E−02 | 2.2839E−02 | 8.1783E−02 | 1.7734E−02 | −4.5474E−02 | 2.2403E−02 |
| R7 | −4.2458E+00 | −1.1244E−01 | 3.7265E−02 | 1.0008E−02 | −4.8236E−02 | −2.7535E−02 | 7.9014E−02 | 3.1803E−03 |
| R8 | 1.5091E+00 | −1.0871E−01 | 5.7492E−02 | 2.5799E−02 | 9.5214E−03 | 1.2762E−02 | 5.9730E−03 | −2.2955E−03 |
| R9 | −6.1282E+00 | −4.8886E−03 | 2.9454E−03 | 1.0237E−02 | −1.5134E−03 | −5.7432E−03 | −2.1074E−03 | 1.2844E−03 |
| R10 | −3.5928E+00 | 4.7366E−02 | −1.5862E−02 | −1.7491E−03 | 2.5589E−04 | 2.1234E−04 | 7.3711E−05 | −1.0458E−05 |
| R11 | −7.0278E+00 | −7.1923E−02 | 1.1043E−02 | 1.1840E−04 | −4.4691E−05 | −5.8398E−06 | −2.0749E−06 | 3.3440E−07 |
| R12 | −4.3445E+00 | −3.8573E−02 | 6.9696E−03 | −9.3511E−04 | 5.4698E−05 | −4.9822E−07 | −1.0144E−07 | 4.7025E−09 |

Table 7 and table 8 show design data of inflexion points and arrest point of each lens of the camera optical lens 20 lens according to Embodiment 2 of the present disclosure.

TABLE 7

| | Number of inflexion points | Inflexion point position 1 | Inflexion point position 2 |
|---|---|---|---|
| P1R1 | 1 | 0.305 | |
| P1R2 | 1 | 0.175 | |
| P2R1 | 1 | 0.755 | |
| P2R2 | 0 | | |
| P3R1 | 2 | 0.155 | 0.785 |
| P3R2 | 2 | 0.535 | 0.675 |
| P4R1 | 1 | 0.875 | |
| P4R2 | 1 | 0.885 | |
| P5R1 | 0 | | |
| P5R2 | 0 | | |
| P6R1 | 2 | 0.545 | 1.745 |
| P6R2 | 2 | 0.775 | 2.765 |

TABLE 8

| | Number of arrest points | Arrest point position 1 | Arrest point position 2 |
|---|---|---|---|
| P1R1 | 1 | 0.515 | |
| P1R2 | 1 | 0.305 | |
| P2R1 | 0 | | |

TABLE 8-continued

| | Number of arrest points | Arrest point position 1 | Arrest point position 2 |
|---|---|---|---|
| P2R2 | 0 | | |
| P3R1 | 1 | 0.255 | |
| P3R2 | 0 | | |
| P4R1 | 0 | | |
| P4R2 | 0 | | |
| P5R1 | 0 | | |
| P5R2 | 0 | | |
| P6R1 | 2 | 1.285 | 2.275 |
| P6R2 | 1 | 1.865 | |

Figure 6:
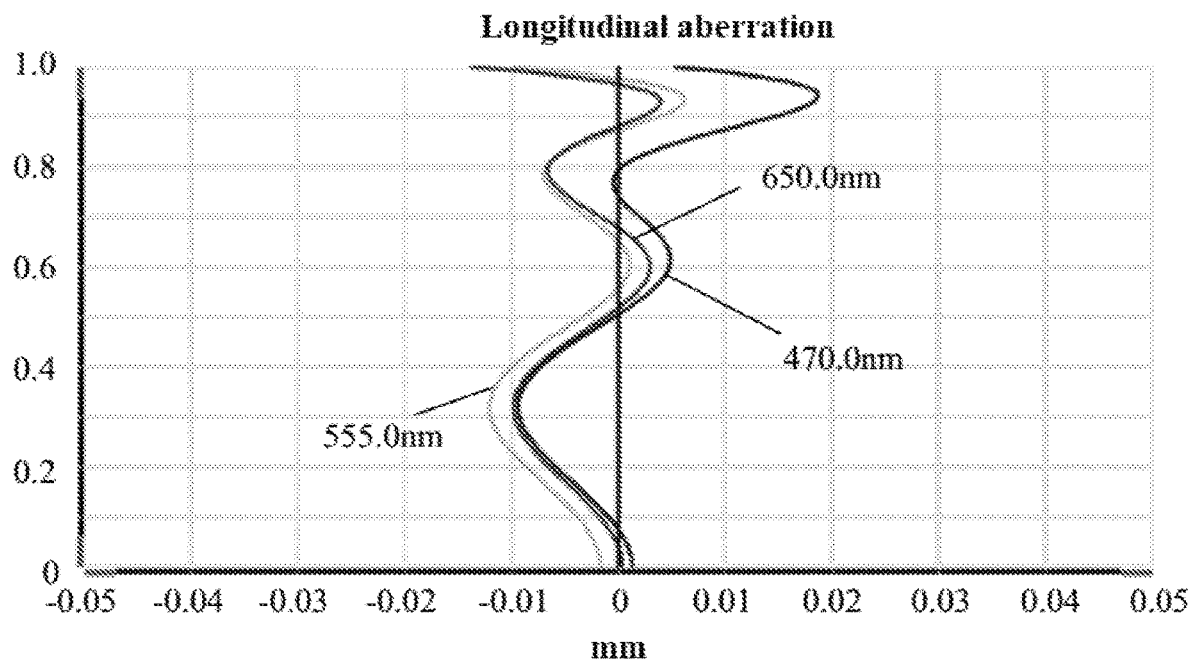
FIG. 6 is a schematic diagram of a longitudinal aberration of the camera optical lens shown in FIG. 5.
Figure 7:
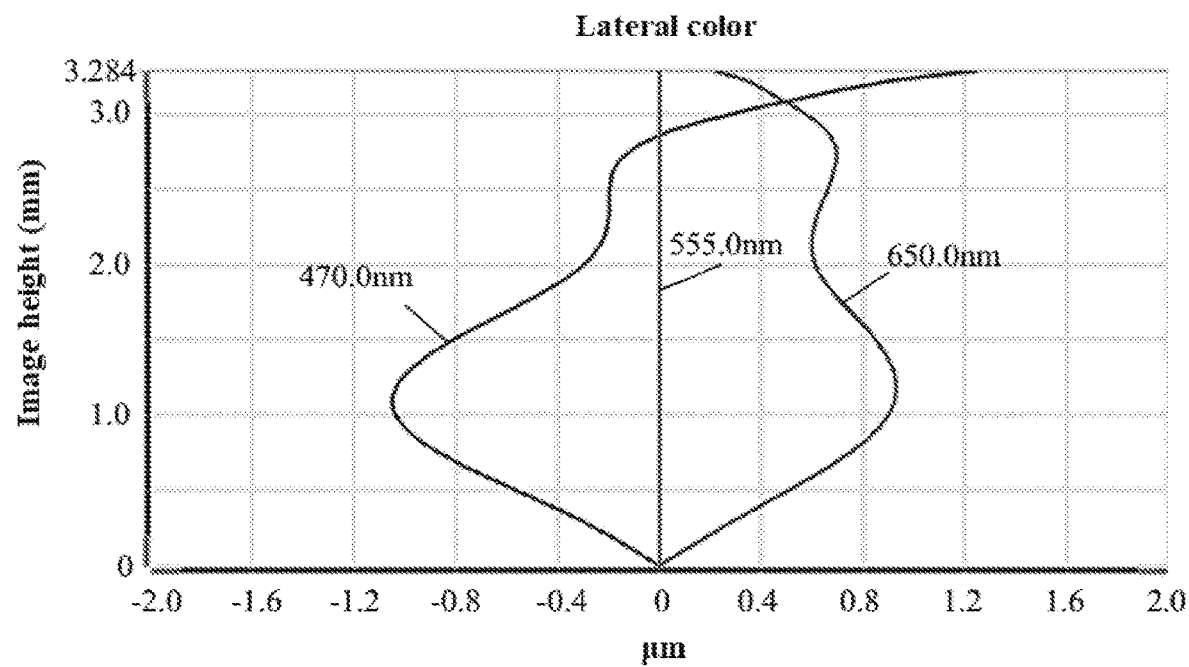
FIG. 7 is a schematic diagram of a lateral color of the camera optical lens shown in FIG. 5.
Figure 8:
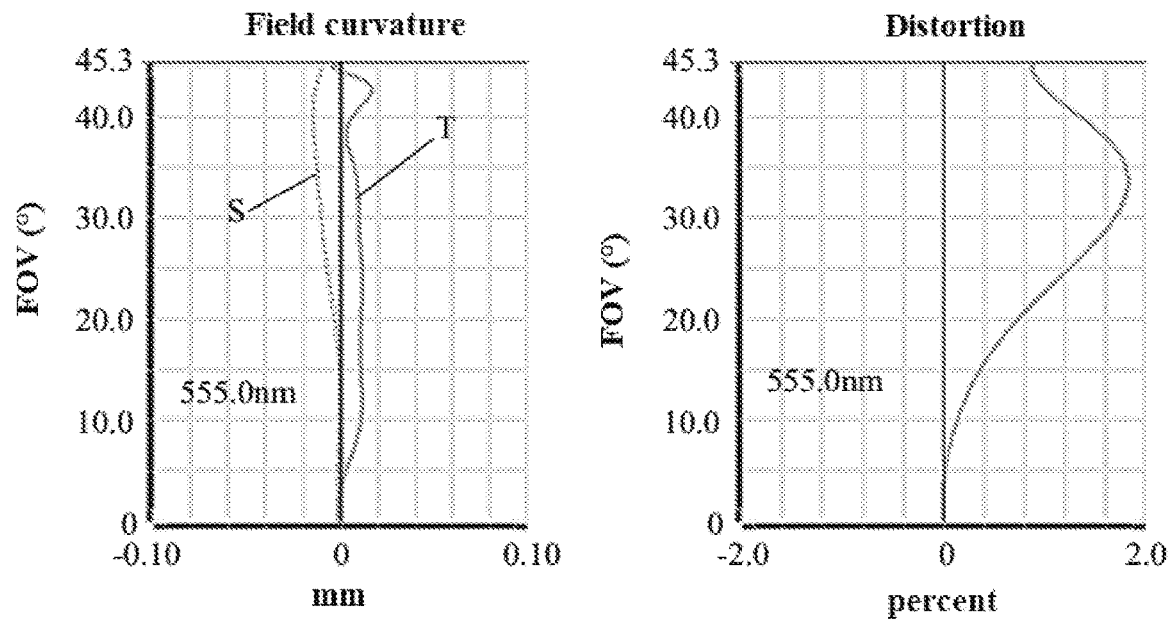
FIG. 8 is a schematic diagram of a field curvature and a distortion of the camera optical lens shown in FIG. 5.
Figure 9:
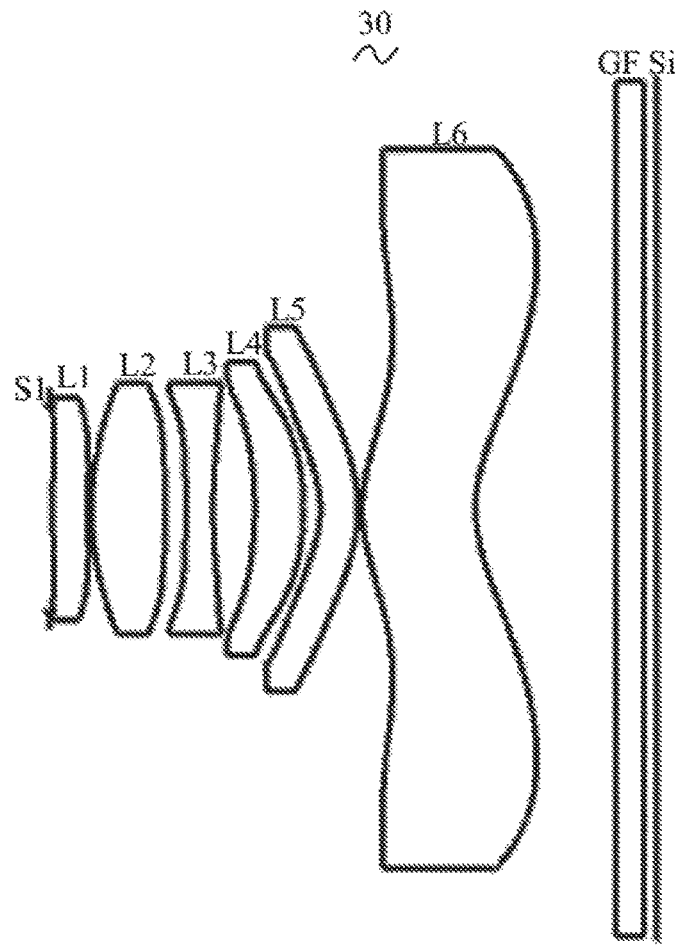
FIG. 9 is a schematic diagram of a structure of a camera optical lens according to Embodiment 3 of the present disclosure.

FIG. 6 and FIG. 7 illustrate a longitudinal aberration and a lateral color of light with wavelengths of 470.0 nm, 555.0 nm and 650.0 nm after passing the camera optical lens 20 according to Embodiment 2. FIG. 8 illustrates a field curvature and a distortion of light with a wavelength of 555.0 nm after passing the camera optical lens 20 according to Embodiment 2.

As shown in Table 13, Embodiment 2 satisfies the above conditions.

In an embodiment, an entrance pupil diameter of the camera optical lens is 1.568 mm, an image height of 1.0H is 3.284 mm, an FOV (field of view) in the diagonal direction is 90.68°. Thus, the camera optical lens has a wide-angle and is ultra-thin. Its on-axis and off-axis aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

|  | R | d |  | nd |  | vd |
|---|---|---|---|---|---|---|
| S1 | ∞ | d0 = 0.020 | | | | |
| R1 | 5.304 | d1 = 0.269 | nd1 | 1.5445 | v1 | 55.99 |
| R2 | 7.554 | d2 = 0.029 | | | | |
| R3 | 2.116 | d3 = 0.562 | nd2 | 1.5445 | v2 | 55.99 |
| R4 | −8.472 | d4 = 0.156 | | | | |
| R5 | −45.076 | d5 = 0.212 | nd3 | 1.6447 | v3 | 22.48 |

TABLE 9-continued

| | R | d | nd | | vd | |
|---|---|---|---|---|---|---|
| R6 | 4.530 | d6 = 0.315 | | | | |
| R7 | −3.100 | d7 = 0.374 | nd4 | 1.5352 | v4 | 56.09 |
| R8 | −1.950 | d8 = 0.122 | | | | |
| R9 | −0.809 | d9 = 0.288 | nd5 | 1.6713 | v5 | 19.24 |
| R10 | −1.134 | d10 = 0.030 | | | | |
| R11 | 1.028 | d11 = 0.867 | nd6 | 1.5352 | v6 | 56.09 |
| R12 | 1.044 | d12 = 1.068 | | | | |
| R13 | ∞ | d13 = 0.210 | ndg | 1.5168 | vg | 64.17 |
| R14 | ∞ | d14 = 0.100 | | | | |

Table 10 shows aspherical surface data of each lens of the camera optical lens 30 in Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 1.0635E+01 | −1.6068E−01 | −1.2383E−01 | 4.8406E−02 | 6.8786E−01 | −1.5797E+00 | 1.0672E+00 | −2.6779E−02 |
| R2 | −1.2790E+02 | −3.0005E−01 | 2.3092E−01 | −2.2305E−01 | 1.0434E−02 | 6.4914E−01 | −1.1568E+00 | 6.8083E−01 |
| R3 | −8.0837E+00 | −5.1548E−03 | 1.4540E−01 | −8.8791E−02 | −9.0034E−02 | 6.9669E−03 | 6.5630E−02 | 9.1391E−03 |
| R4 | −8.6024E+01 | −7.2426E−03 | −1.0176E−01 | −1.8985E−01 | 1.8739E−01 | 1.3147E−03 | −9.5279E−03 | 2.9576E−02 |
| R5 | 1.2028E+02 | −1.4258E−01 | −1.5300E−01 | −9.3256E−02 | 2.1331E−01 | 2.0629E−01 | −1.9180E−02 | −1.3227E−01 |
| R6 | 2.5997E+00 | −5.3085E−02 | −7.6753E−02 | 2.1125E−02 | 8.5844E−02 | 1.8365E−02 | −4.8361E−02 | 2.3026E−02 |
| R7 | −4.5785E+00 | −1.1229E−01 | 3.5417E−01 | 1.0996E−02 | −4.4542E−02 | −2.4508E−02 | 7.7644E−02 | −2.3077E−03 |
| R8 | 1.4986E+00 | −1.0775E−01 | 5.7844E−02 | 2.4932E−02 | 8.6233E−03 | 1.2446E−02 | 5.7560E−03 | −2.9464E−03 |
| R9 | −6.1830E+00 | −2.0907E−03 | 3.4610E−03 | 1.0259E−02 | −1.7283E−03 | −5.9926E−03 | −2.2099E−03 | 1.2957E−03 |
| R10 | −3.5397E+00 | 4.7171E−02 | −1.5575E−02 | −1.6149E−03 | 2.4381E−04 | 1.3798E−04 | 1.7301E−05 | −1.2850E−05 |
| R11 | −7.0083E+00 | −7.1709E−02 | 1.1068E−02 | 1.3348E−04 | −4.4804E−05 | −6.4795E−06 | −2.1621E−06 | 3.5256E−07 |
| R12 | −4.3488E+00 | −3.9481E−02 | 7.1621E−03 | −9.3263E−04 | 5.4282E−05 | −6.8201E−07 | −1.1964E−07 | 8.4005E−09 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 |
|---|---|---|---|
| P1R1 | 1 | 0.305 | |
| P1R2 | 1 | 0.195 | |
| P2R1 | 0 | | |
| P2R2 | 1 | 0.885 | |
| P3R1 | 1 | 0.795 | |
| P3R2 | 2 | 0.485 | 0.725 |
| P4R1 | 1 | 0.865 | |
| P4R2 | 1 | 0.885 | |
| P5R1 | 0 | | |
| P5R2 | 0 | | |
| P6R1 | 2 | 0.545 | 1.745 |
| P6R2 | 1 | 0.765 | |

TABLE 12

| | Number of arrest point | Arrest point position 1 |
|---|---|---|
| P1R1 | 1 | 0.515 |
| P1R2 | 1 | 0.335 |
| P2R1 | 0 | |
| P2R2 | 0 | |
| P3R1 | 0 | |
| P3R2 | 0 | |
| P4R1 | 0 | |
| P4R2 | 0 | |

TABLE 12-continued

| | Number of arrest point | Arrest point position 1 |
|---|---|---|
| P5R1 | 0 | |
| P5R2 | 0 | |
| P6R1 | 1 | 1.305 |
| P6R2 | 1 | 1.895 |

Figure 10:
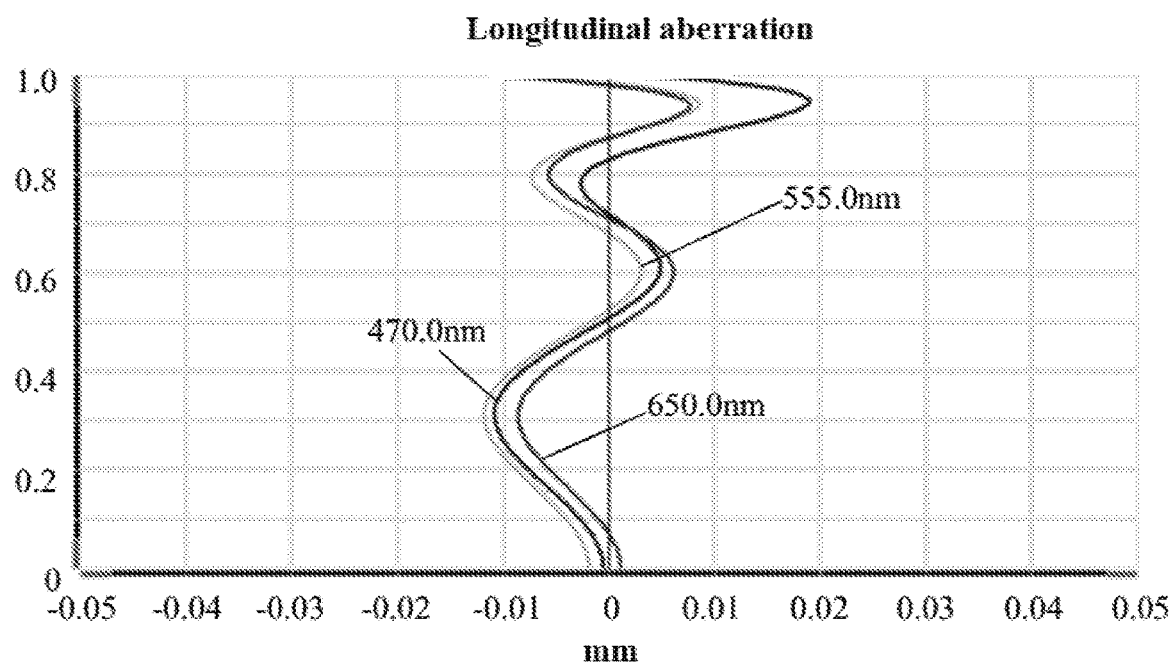
FIG. 10 is a schematic diagram of a longitudinal aberration of the camera optical lens shown in FIG. 9.
Figure 11:
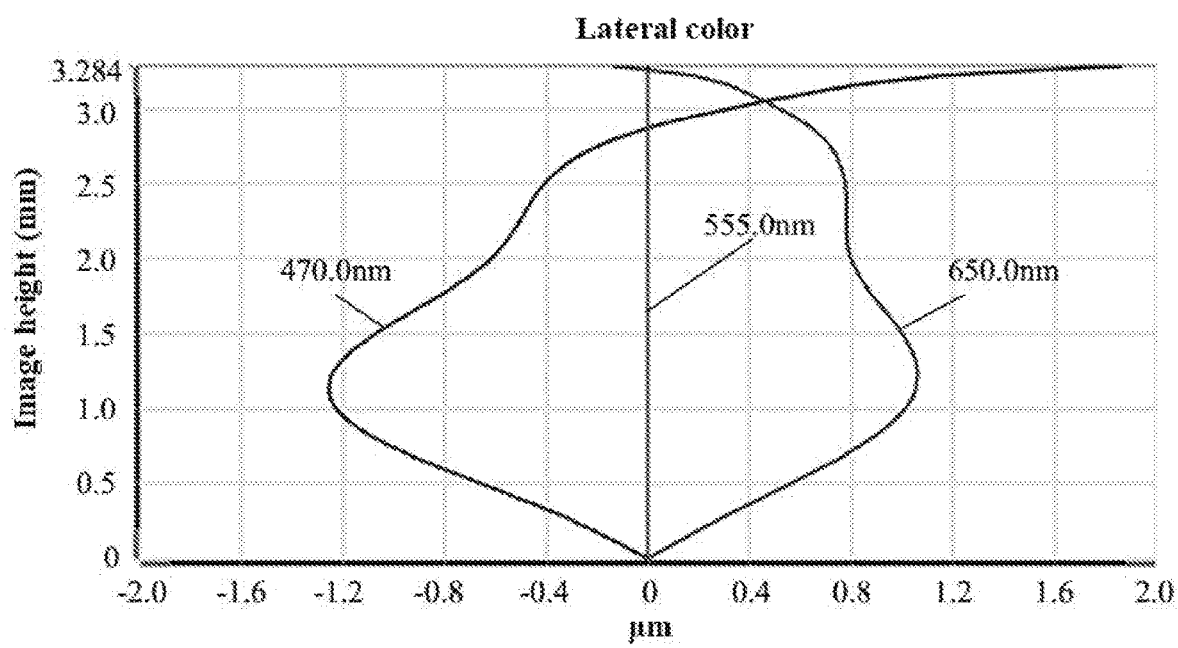
FIG. 11 is a schematic diagram of a lateral color of the camera optical lens shown in FIG. 9.
Figure 12:
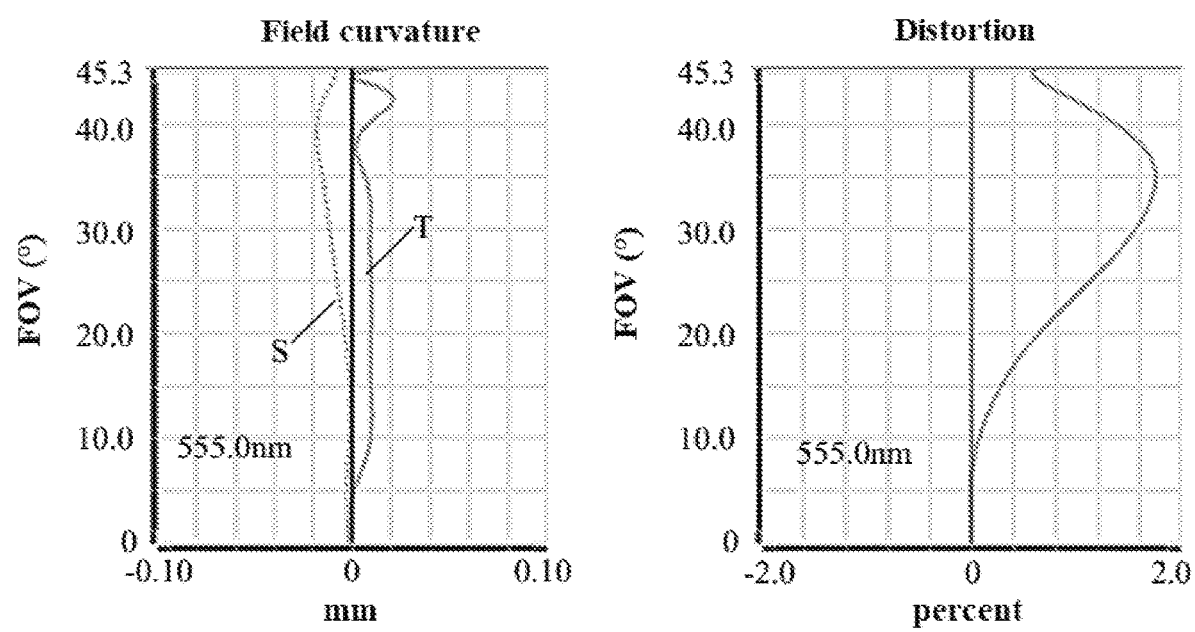
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470.0 nm, 555.0 nm and 650.0 nm after passing the camera optical lens 30 according to Embodiment 3. FIG. 12 illustrates a field curvature and a distortion of light with a wavelength of 555.0 nm after passing the camera optical lens 30 according to Embodiment 3.

Table 13 in the following lists values corresponding to the respective conditions in an embodiment according to the above conditions. Obviously, the embodiment satisfies the above conditions.

In an embodiment, an entrance pupil diameter of the camera optical lens is 1.574 mm, an image height of 1.0H is 3.284 mm, an FOV (field of view) in the diagonal direction is 90.64°. Thus, the camera optical lens has a wide-angle and is ultra-thin. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f | 3.219 | 3.215 | 3.226 |
| f1 | 15.962 | 21.851 | 31.278 |
| f2 | 3.468 | 3.280 | 3.159 |
| f3 | −6.310 | −6.371 | −6.323 |
| f4 | 8.818 | 8.204 | 8.792 |
| f5 | −6.310 | −6.093 | −6.481 |
| f6 | 6.086 | 6.198 | 6.261 |
| f12 | 2.914 | 2.911 | 2.925 |
| FNO | 2.05 | 2.05 | 2.05 |
| f1/f3 | −2.53 | −3.43 | −4.95 |
| R5/R6 | −2.10 | −6.10 | −9.95 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
   a first lens having a positive refractive power;
   a second lens having a positive refractive power;
   a third lens having a negative refractive power;
   a fourth lens;
   a fifth lens; and
   a sixth lens;
   wherein the first lens comprises an object-side surface being convex in a paraxial region and an image-side surface being concave in the paraxial region;
   wherein the camera optical lens satisfies following conditions:

$3.97 \leq f1/f \leq 11.63$;

$-7.14 \leq (R1+R2)/(R1-R2) \leq -2.26$;

$0.05 \leq d1/TTL \leq 0.07$;

$-5.00 \leq f1/f3 \leq -2.50$; and $-10.00 \leq R5/R6 \leq -2.00$;

where
   f denotes a focal length of the camera optical lens;
   R1 denotes a curvature radius of the object-side surface of the first lens;
   R2 denotes a curvature radius of the image-side surface of the first lens;
   d1 denotes an on-axis thickness of the first lens;
   TTL denotes a total optical length from the object-side surface of the first lens to an image surface of the camera optical lens along an optical axis;
   f1 denotes a focal length of the first lens;
   f3 denotes a focal length of the third lens;
   R5 denotes a curvature radius of an object-side surface of the third lens; and
   R6 denotes a curvature radius of an image-side surface of the third lens.

2. The camera optical lens according to claim 1 further satisfying following conditions:

$-4.97 \leq f1/f3 \leq -2.52$; and $-9.98 \leq R5/R6 \leq -2.05$.

3. The camera optical lens according to claim 1, wherein the second lens comprises an object-side surface being convex in a paraxial region and an image-side surface being convex in the paraxial region; and
   the camera optical lens further satisfies following conditions:

$0.49 \leq f2/f \leq 1.62$;

$-1.29 \leq (R3+R4)/(R3-R4) \leq -0.40$; and $0.06 \leq d3/TTL \leq 0.18$;

where
   f denotes a focal length of the camera optical lens;
   f2 denotes a focal length of the second lens;
   R3 denotes a curvature radius of the object-side surface of the second lens;
   R4 denotes a curvature radius of the image-side surface of the second lens;
   d3 denotes an on-axis thickness of the second lens; and
   TTL denotes a total optical length from an object-side surface of the first lens to an image surface of the camera optical lens along an optical axis.

4. The camera optical lens according to claim 3 further satisfying following conditions:

$0.78 \leq f2/f \leq 1.29$;

$-0.80 \leq (R3+R4)/(R3-R4) \leq -0.50$; and $0.10 \leq d3/TTL \leq 0.15$.

5. The camera optical lens according to claim 1, wherein the object-side surface of the third lens is concave in a paraxial region and the image-side surface of the third lens is concave in the paraxial region, and
   the camera optical lens further satisfies following conditions:

$-3.96 \leq f3/f \leq -1.31$;

$0.18 \leq (R5+R6)/(R5-R6) \leq 1.23$; and $0.02 \leq d5/TTL \leq 0.07$;

where
   f denotes a focal length of the camera optical lens;
   d5 denotes an on-axis thickness of the third lens; and
   TTL denotes a total optical length from an object-side surface of the first lens to an image surface of the camera optical lens along an optical axis.

6. The camera optical lens according to claim 5 further satisfying following conditions:

$-2.48 \leq f3/f \leq -1.63$;

$0.28 \leq (R5+R6)/(R5-R6) \leq 0.98$; and $0.04 \leq d5/TTL \leq 0.06$.

7. The camera optical lens according to claim 1, wherein the fourth lens has a positive refractive power, and comprises an object-side surface being concave in a paraxial region and an image-side surface being convex in the paraxial region, and
   the camera optical lens further satisfies following conditions:

$1.28 \leq f4/f \leq 4.11$;

$2.02 \leq (R7+R8)/(R7-R8) \leq 6.62$; and $0.04 \leq d7/TTL \leq 0.12$;

where
   f denotes a focal length of the camera optical lens;
   f4 denotes a focal length of the fourth lens;
   R7 denotes a curvature radius of the object-side surface of the fourth lens;
   R8 denotes a curvature radius of the image-side surface of the fourth lens;
   d7 denotes an on-axis thickness of the fourth lens; and
   TTL denotes a total optical length from an object-side surface of the first lens to an image surface of the camera optical lens along an optical axis.

8. The camera optical lens according to claim 7 further satisfying following conditions:

$2.04 \leq f4/f \leq 3.29$;

$3.23 \leq (R7+R8)/(R7-R8) \leq 5.30$; and $0.06 \leq d7/TTL \leq 0.10$.

9. The camera optical lens according to claim 1, wherein the fifth lens has a negative refractive power, and comprises an object-side surface being concave in a paraxial region and an image-side surface being convex in the paraxial region, and the camera optical lens further satisfies following conditions:

$-4.02 \leq f5/f \leq -1.26$;

$-11.96 \leq (R9+R10)/(R9-R10) \leq -3.76$; and $0.03 \leq d9/TTL \leq 0.10$;

where f denotes a focal length of the camera optical lens;
f5 denotes a focal length of the fifth lens;
R9 denotes a curvature radius of the object-side surface of the fifth lens;
R10 denotes a curvature radius of the image-side surface of the fifth lens;
d9 denotes an on-axis thickness of the fifth lens; and
TTL denotes a total optical length from an object-side surface of the first lens to an image surface of the camera optical lens along an optical axis.

10. The camera optical lens according to claim 9 further satisfying following conditions:

$-2.51 \leq f5/f \leq -1.58$;

$-7.47 \leq (R9+R10)/(R9-R10) \leq -4.70$; and $0.05 \leq d9/TTL \leq 0.08$.

11. The camera optical lens according to claim 1, wherein the sixth lens has a positive refractive power, and comprises an object-side surface being convex in a paraxial region and an image-side surface being concave in the paraxial region, and the camera optical lens further satisfies following conditions:

$0.95 \leq f6/f \leq 2.91$;

$-253.81 \leq (R11+R12)/(R11-R12) \leq -52.28$; and $0.09 \leq d11/TTL \leq 0.29$;

where f denotes a focal length of the camera optical lens;
f6 denotes a focal length of the sixth lens;
R11 denotes a curvature radius of the object-side surface of the sixth lens;
R12 denotes a curvature radius of the image-side surface of the sixth lens;
d11 denotes an on-axis thickness of the sixth lens; and
TTL denotes a total optical length from an object-side surface of the first lens to an image surface of the camera optical lens along an optical axis.

12. The camera optical lens according to claim 11 further satisfying following conditions:

$1.51 \leq f6/f \leq 2.33$;

$-158.63 \leq (R11+R12)/(R11-R12) \leq -65.35$; and $0.15 \leq d11/TTL \leq 0.23$.

13. The camera optical lens according to claim 1 further satisfying following condition:

$0.45 \leq f12/f \leq 1.36$;

where f denotes a focal length of the camera optical lens; and
f12 denotes a combined focal length of the first lens and the second lens.

14. The camera optical lens according to claim 13 further satisfying following condition:

$0.72 \leq f12/f \leq 1.09$.

15. The camera optical lens according to claim 1, where a total optical length TTL from an object-side surface of the first lens to an image surface of the camera optical lens along an optical axis is less than or equal to 5.06 mm.

16. The camera optical lens according to claim 15, wherein the total optical length TTL of the camera optical lens is less than or equal to 4.83 mm.

17. The camera optical lens according to claim 1, wherein an F number of the camera optical lens is less than or equal to 2.11.

18. The camera optical lens according to claim 17, wherein the F number of the camera optical lens is less than or equal to 2.07.

* * * * *